(12) United States Patent
Stalewski

(10) Patent No.: US 11,940,766 B2
(45) Date of Patent: Mar. 26, 2024

(54) REAL ESTATE MONITORING SYSTEM

(71) Applicant: EBS SPOLKA Z OGRANICZONA ODPOWIEDZIALNOSCIA 3E PRODUCTION SP.K., Elk (PL)

(72) Inventor: Krzysztof Stalewski, Elk (PL)

(73) Assignee: EBS SP. Z O.O. 3E PRODUCTION SP.K., Elk (PL)

( * ) Notice: Subject to any disclaimer, the term of this patent is extended or adjusted under 35 U.S.C. 154(b) by 604 days.

(21) Appl. No.: 17/262,381

(22) PCT Filed: Jul. 24, 2019

(86) PCT No.: PCT/EP2019/069975
§ 371 (c)(1),
(2) Date: Jan. 25, 2021

(87) PCT Pub. No.: WO2020/020975
PCT Pub. Date: Jan. 30, 2020

(65) Prior Publication Data
US 2021/0141356 A1 May 13, 2021

(30) Foreign Application Priority Data
Jul. 25, 2018 (EP) .................... 18185528

(51) Int. Cl.
*G05B 19/042* (2006.01)
*G06K 7/10* (2006.01)
(Continued)

(52) U.S. Cl.
CPC ....... *G05B 19/042* (2013.01); *G06K 7/10297* (2013.01); *G06K 19/0723* (2013.01);
(Continued)

(58) Field of Classification Search
CPC .................. G05B 15/02; G05B 19/042; G05B 2219/163; G05B 2219/2642; G06Q 30/0185; G06Q 50/163; H04W 84/18
(Continued)

(56) References Cited

U.S. PATENT DOCUMENTS

2011/0087377 A1 4/2011 Nabeshima et al.
2011/0254760 A1 10/2011 Lloyd et al.
(Continued)

FOREIGN PATENT DOCUMENTS

CN 102932215 A 2/2013
CN 103794015 A 5/2014
(Continued)

OTHER PUBLICATIONS

International Search Report dated Jan. 30, 2020 in parent International application PCT/EP2019/069975.
(Continued)

*Primary Examiner* — Chun Cao
(74) *Attorney, Agent, or Firm* — Polson Intellectual Property Law, PC; Margaret Polson; Christopher Sylvain

(57) ABSTRACT

The real estate monitoring system, comprising a monitoring module (10), which is adapted to the real estate monitoring capacities and contains at least one sensor (15), which is installed within the real estate, with a monitoring module (10) configured to respond to changes in physical parameters that are recorded by the sensor (15); furthermore, the monitoring module (10), which is equipped with a receiver (13) for a wireless communication system, and a keyboard (12) for selecting the operating mode of the real estate monitoring system communicatively linked to the monitoring module (10), and the identification tag (20) with memory (25), microprocessor (27) and transmitter (23) of the wireless
(Continued)

communication system, and a battery (26), with a unique identification tag number (20) stored in the memory (25) of the identification tag. In addition, the monitoring module (10) is communicatively linked to the database (1), in which data representing the unique tag identification number (20) and its assigned authority to change the operating mode of the monitoring system are stored; characterized in that the identification tag (20) is fitted with an accelerometer (24) suitable for measuring accelerations, and that the tag (20) is adapted so as to switch off the transmitter (23) of the wireless communication system when the accelerometer signal (24) corresponds to the acceleration signals occurring when the tag is at rest (20), and turns on the transmitter (23) of the wireless communication system when the accelerometer signal (24) corresponds to the acceleration signals occurring when the tag is (20) in motion, in addition, the tag (20) is adapted for the cyclical transmission of a signal representing the unique tag identification number (20) when the transmitter (23) and the receiver (13) of the wireless communication system are switched on, and the monitoring module (10) is adapted to verify the correctness of the unique identification number received, to check in the database (1) the authorisations assigned to the unique identification number and to generate a signal to change the mode of operation of the real estate monitoring system in response to the receipt of a signal representing the unique identification number of the tag (20), to which the required authorisation to change the mode of operation of the monitoring system have been assigned and to press the button on the keyboard (12) to select the mode of operation of the real estate monitoring system.

3 Claims, 1 Drawing Sheet

(51) Int. Cl.
| | | |
|---|---|---|
| *G06K 19/07* | | (2006.01) |
| *G06Q 30/018* | | (2023.01) |
| *H04W 84/18* | | (2009.01) |

(52) U.S. Cl.
CPC ....... *G06Q 30/0185* (2013.01); *G06Q 50/163* (2013.01); *G05B 2219/2642* (2013.01); *H04W 84/18* (2013.01)

(58) Field of Classification Search
USPC .......................................................... 700/28
See application file for complete search history.

(56) References Cited

U.S. PATENT DOCUMENTS

| | | | | |
|---|---|---|---|---|
| 2015/0002274 | A1* | 1/2015 | Sengstaken, Jr. | ....... A61J 1/035 340/10.34 |
| 2016/0353381 | A1 | 12/2016 | Hsu et al. | |
| 2017/0328997 | A1* | 11/2017 | Silverstein | .............. G01S 13/86 |
| 2018/0196972 | A1* | 7/2018 | Lu | ..................... H04W 52/0274 |
| 2021/0049436 | A1* | 2/2021 | Nalbant | ............. G06K 19/0723 |

FOREIGN PATENT DOCUMENTS

| | | | |
|---|---|---|---|
| CN | 105259771 A | 1/2016 | |
| CN | 105796559 A | 7/2016 | |
| CN | 106406116 A | 2/2017 | |
| CN | 106707786 A | 5/2017 | |
| CN | 106936673 A | 7/2017 | |
| WO | WO-2015144210 A1 * | 10/2015 | ............. G06F 21/35 |

OTHER PUBLICATIONS

Written Opinion of the International Searching Authority dated Jan. 30, 2020 in parent International application PCT/EP2019/069975.
Roy Want et al: "The active badge location system",ACM Transactions on Information Systems, Association for Computing Machinery, 2 Penn Plaza, Suite 701 New York NY 10121-0701 USA, val. 10, No. 1, Jan. 2, 1992 (Jan. 2, 1992), pp. 91-102, XP058233190, ISSN: 1 046-8188, DOI: 10.1145/128756.128759.

* cited by examiner

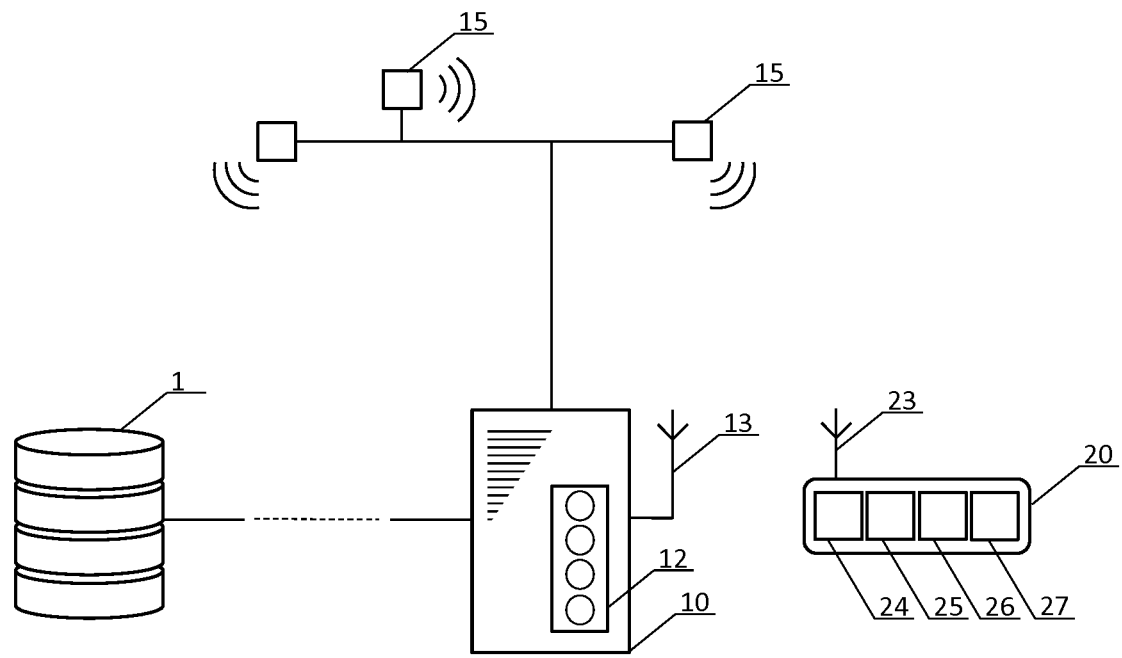

REAL ESTATE MONITORING SYSTEM

The subject of the invention is the real estate monitoring system.

This solution belongs to the area of intelligent home management systems and intelligent alarm systems.

Smart home management systems are systems that use information from multiple interconnected sensors, detectors or household appliances to manage them in order to improve the quality of life and safety of users.

There are known the state of the art solutions for intelligent home management systems based on a wide range of devices and detectors. The descriptions of finished systems and peripherals cooperating within one system are known from the publications CN 106707786 A and CN 106936673 A. They present a wide range of applications, including devices, such as washing machines, refrigerators, ovens, alarm sensors, thermostats, solenoids and others with the base station, allowing their wireless two-way communication with the use of popular smartphones. With the right configuration, users have an influence on individual aspects of everyday life, such as savings (automatic light switches, thermostats), comfort of life (remote start of household appliances, air conditioning, irrigation systems) or safety (wireless cameras, motion detectors, smoke detectors). Various configurations and operating methods of intelligent house systems designed to secure and protect property and users are known from publications CN 105976559 A, CN 103794015 A and CN 106406116 A. Thanks to the interaction of the base station with safety sensors, such as reed sensors, motion detectors, smoke detectors, wireless cameras and flood detectors, home security systems based on an individual level of protection of users have been developed at a low cost, while maintaining full integrity and wireless availability. Simple construction and configuration allows you to monitor the status of your property through your smartphone or web browser, as well as to program specific actions in case of an attempted burglary. Intelligent real estate monitoring systems, like any security system, are exposed to an attempt to take over control by unauthorised persons. Publications CN 105259771 A and CN 102932215 A are used to verify and authorise users in intelligent monitoring systems. Thanks to wireless communication (Wi-Fi, Bluetooth, NFC) between the system and verification device, e.g. smartphone, NFC card, smartphone, key ring, user within the communication range of the intelligent monitoring system can be authenticated actively (entering code, bringing the card closer to the reader, clicking in the application) or passively (the device is located in the same Wi-Fi or Bluetooth network). After positive authentication, the system performs the user's authorisation based on the obtained data. This option allows you to restrict access to specific devices, functions or areas of your property.

The essence of the invention is a real estate monitoring system, containing a monitoring module, which is adapted to real estate monitoring and contains at least one sensor, which is installed within the real estate, the monitoring module is configured to respond to changes in physical parameters, which are recorded by the sensor. Furthermore, the monitoring module is equipped with a receiver of wireless communication system and a keyboard for selecting the mode of operation of the real estate monitoring system connected by communication with the monitoring module. The system contains a memory-based identification tag, a microprocessor and a transmitter for the wireless communication system, as well as a battery, with the unique identification tag number stored in the memory of the identification tag. In addition, the monitoring module shall be communicatively linked to the database, in which data representing the unique tag identification number and its assigned powers to change the operating mode of the monitoring system are stored. It has an accelerometer fitted to the identification tag for measuring accelerations and is adapted so as to turn off the transmitter of the wireless communication system when the accelerometer signal corresponds to the acceleration signals, occurring while the tag is at rest, and activates the transmitter of the wireless communication system when the accelerometer signal corresponds to the acceleration signals, occurring while the tag is in motion. The tag is designed to periodically transmit a signal representing the unique tag identification number when the transmitter and receiver of the wireless communication system are turned on; however, the monitoring module is designed to validate the received unique tag identification number, check the authorisation assigned to the unique tag identification number in the database, and generate a change of mode signal to the real estate monitoring system in response to the receipt of a signal representing the unique tag identification number to which the required authorisation to change the operating mode of the monitoring system is assigned, and press a button on the keyboard to select the operating mode of the real estate monitoring system.

In addition, according to the invention, the system is provided with the identification tag is equipped with an accelerometer to measure accelerations. Furthermore, the tag is adapted to turn off the transmitter of the wireless communication system when the accelerometer signal corresponds to the acceleration signals occurring while the tag is at rest, and a wireless communication system transmitter when the accelerometer signal corresponds to the acceleration signals occurring while the tag is in motion. The tag is also adapted to cyclical transmission of a signal representing the unique identification tag number when the transmitter and receiver of the wireless communication system are in operation.

System according to the invention is provided with the monitoring module that is adapted to verify the correctness of the unique identification number received, to check in the database the authorisations assigned to the unique identification number and to generate a signal to change the operating mode of the real estate monitoring system in response to the receipt of a signal representing the unique identification number of the tag, to which the required authorisations to change the operating mode of the monitoring system have been assigned and in response to signal representing pressing the button on the keyboard to select the operating mode of the real estate monitoring system.

Real estate monitoring system according to the invention is characterized in that the receiver of the monitoring module and the transmitter of the tag are bidirectional wireless communication system modules. Real estate monitoring system according to the invention are characterized in that the keyboard of the monitoring module contains a sensor which is a motion detector.

Further an object of the invention is the identification tag that is equipped with the accelerometer suitable for measuring accelerations; furthermore, the tag is adapted to switch off the transmitter of the wireless communication system when the accelerometer signal corresponds to the acceleration signals occurring while the tag is at rest, and to switch on the transmitter of the wireless communication system when the accelerometer signal corresponds to the acceleration signals occurring while the tag is in motion; further the tag is adapted to send a cyclic signal transmission representing the unique tag identification number when the transmitter and the receiver of a wireless communication system are switched on.

According to the invention, the advantage of the system is quick and precise identification of the user's authorisation within the operation of one or more real estate monitoring systems. This advantage has been achieved by using a battery-powered identification tag equipped with an accelerometer and a monitoring module connected to the database. Moreover, the advantage of using an identification tag is the possibility of assigning different rights to the user registered in several real estate monitoring systems.

The subject of the invention is presented in more detail in a favourable example in the drawing, in which:

FIG. 1 presents a diagram of the real estate monitoring system according to the invention.

In FIG. 1, the diagram of the real estate monitoring system according to the invention was presented. The monitoring system includes a monitoring module (10) equipped with a wireless keyboard (12) and a wireless communication system receiver (13) (e.g. Wi-Fi, Bluetooth, NFC), adapted to the real estate monitoring capacities, containing at least one sensor (15) installed within the property and connected to the system's database (1). When the user is detected within the range of the real estate monitoring system, or an attempt is made to change the operating mode of the system (disarmament, day mode, night mode, full arming), by pressing the button on wireless keyboard (12), the monitoring module (10) activates the wireless receiver (13), pending the receipt of the unique user identification number. The keyboard (12) of the monitoring module (10) is also equipped with a sensor (15), which is e.g. a motion detector (passive PIR sensor). The use of the motion sensor (15) on the keyboard (12) of the monitoring module (10) allows to detect the user near the monitoring module, which significantly affects the speed of system operation by prior activation of the wireless communication receiver (13). Furthermore, the use of the motion sensor on the keyboard (12) of the monitoring module can improve the comfort of using the system at night by e.g. illuminating the keyboard (12) at the moment of detecting the user. A user who is within the scope of the real estate monitoring system can be identified by having an identification tag (20). Before using it for the first time, the tag (20) must be paired with the monitoring system to register its unique identification number in the system's database (1). Adding and removing tags (20) (for new users and in case of loss or theft) to the property monitoring system can be done by means of a dedicated computer application to configure the system or the user's mobile application with appropriate permissions. The identification tag (20) may take the form of, inter alia, a key ring, wristband or smartwatch and is adapted to the cyclical assignment of a unique identification number stored in the memory (25) of the tag (20).

In the favourable example of the implementation, the wireless communication modules (13) and (23) of the monitoring modules (10) and (20) are the modules of two-way wireless communication system. Application of the two-way communication allows mutual waking up of the monitoring module (10) and the tag (20), which significantly affects the safety and speed of the system operation.

Tag (20) can also be equipped with an accelerometer (24), based on which the transmitter (23) is activated. The use of the accelerometer (24) has a positive impact on the system safety by combining data from accelerometer (24) with a unique identification number to avoid the possibility of retransmission of the signal by unauthorised persons. In addition, activating and deactivating the transmitter (23) with the accelerometer (24) has a significant impact on the battery (26) life and the battery performance. The activated receiver (13) of wireless transmission receives the unique identification number from the wireless transmitter (23) of the identification tag (20). In order to increase security, microprocessor (27) randomly changes the transmission frequency of the wireless transmission (23) identification number. For this purpose, an in-house data transmission standard will be developed operating in unlicensed ISM bands (e.g. 868 MHz, 915 MHz). Verification of the unique identification number received by receiver (13) of the monitoring module (10) is performed by comparing it with the data of the registered identification numbers stored in the database (1).

Then, the set of authorisations assigned to the unique identification number is read. To shorten the verification time of the unique identification number, an updated copy of the database (1) can be found in the monitoring module (10) or in the wireless keyboard (12). Correct verification of the user's authorisations allows to change the mode of operation of the real estate monitoring system. In case of repeated incorrect verification or lack of authorisations, the monitoring module 10 temporarily blocks access to the wireless keyboard (12).

Table of Contents

1—database
10—monitoring module
12—keyboard
13—receiver of wireless communication system
15—sensors
20—smart tag
23—wireless communication transmitter
24—accelerometer
25—memory
26—battery
27—microprocessor

The invention claimed is:

1. A real estate monitoring system comprising:
a monitoring module, which is adapted to the real estate monitoring capacities and includes at least one sensor installed within a premises, wherein the monitoring module is configured to respond to changes in physical parameters that are recorded by the at least one sensor;
an identification tag with a memory, a microprocessor, a transmitter for a wireless communication system, and a battery, whereby a unique identification tag number is stored in the memory of the identification tag;
wherein the monitoring module is communicatively linked to a database in which data representing the unique identification tag number and its associated authority to change an operating mode of the real estate monitoring system are stored;
the identification tag is fitted with an accelerometer for measuring accelerations; the identification tag is adapted to switch off the transmitter of the wireless communication system when the accelerometer signal corresponds to acceleration signals occurring while the identification tag is at rest, and to switch on the transmitter of the wireless communication system when the accelerometer signal corresponds to acceleration signals occurring when the identification tag is in motion;

the identification tag is adapted to send a cyclic signal transmission representing the unique identification tag number when the transmitter and a receiver of the wireless communication system are switched on;

the monitoring module is equipped with the receiver for the wireless communication system and a keyboard for selecting the operating mode of the real estate monitoring system, communicatively linked within the monitoring module; and the monitoring module is adapted to verify the correctness of the unique identification tag number received, to check authorizations assigned to the unique identification tag number in the database, and to generate a signal to change the operating mode of the real estate monitoring system in response to the receipt of both:
- a signal representing the unique identification tag number of the identification tag by the receiver of the monitoring module from the transmitter of the identification tag, to which the authorizations required to change the operating mode of the real estate monitoring system have been assigned, and
- a signal representing pressing a button on the keyboard to select the operating mode of the real estate monitoring system.

2. The real estate monitoring system of claim 1, wherein the receiver of the monitoring module and the transmitter of the identification tag are bidirectional wireless communication system modules.

3. The real estate monitoring system of claim 1, wherein the keyboard of the monitoring module contains a sensor which is a motion detector.

\* \* \* \* \*